(12) United States Patent
Lipeles

(10) Patent No.: US 6,892,981 B2
(45) Date of Patent: May 17, 2005

(54) STEALTHY DUFFEL BAG AIRPLANE

(76) Inventor: Jay Lipeles, 461 Majestic Oak Dr., Apopka, FL (US) 32712

( * ) Notice: Subject to any disclaimer, the term of this patent is extended or adjusted under 35 U.S.C. 154(b) by 0 days.

(21) Appl. No.: 10/408,981

(22) Filed: Apr. 8, 2003

(65) Prior Publication Data

US 2003/0192985 A1 Oct. 16, 2003

Related U.S. Application Data

(60) Provisional application No. 60/371,603, filed on Apr. 10, 2002.

(51) Int. Cl.[7] ............................................... B64C 39/00
(52) U.S. Cl. ............................................. 244/13; 244/5
(58) Field of Search ............................... 244/5, 13, 25, 244/38

(56) References Cited

U.S. PATENT DOCUMENTS

| | | | | |
|---|---|---|---|---|
| 2,379,355 A | * | 6/1945 | Hodgdon | 244/5 |
| 3,136,507 A | * | 6/1964 | Erlanger et al. | 244/135 B |
| 3,981,143 A | * | 9/1976 | Ross et al. | 60/264 |
| 5,474,257 A | * | 12/1995 | Fisher et al. | 244/49 |
| 5,518,205 A | * | 5/1996 | Wurst et al. | 244/58 |
| 6,253,540 B1 | * | 7/2001 | Chew et al. | 60/262 |

* cited by examiner

*Primary Examiner*—Robert P. Swiatek
(74) *Attorney, Agent, or Firm*—David G. Maire; Beusse Brownlee Wolter Mora & Maire, P.A.

(57) ABSTRACT

The Duffel Bag Airplane is an inflatable flying wing unmanned airborne vehicle (UAV). The fuselage will house everything but the wings. The wing can be rolled up around the fuselage into a small package when deflated for easy transportation, such as by being carried in a duffle bag. Fabric construction, a small internal combustion engine with cooled exhaust, and wing warping controls combine to make the airplane inexpensive and extremely stealthy. All the usual signatures have been suppressed, which allow it to be used to make observations from close range under combat conditions. Control of this airplane is accomplished by warping the wings and is supplemented with stability augmentation.

21 Claims, 2 Drawing Sheets

STEALTHY DUFFEL BAG AIRPLANE

This application claims the benefit of the filing date of U.S. provisional application No. 60/371,603 filed on Apr. 10, 2002. That provisional application is hereby incorporated by reference herein in its entirety.

FIELD OF THE INVENTION

The following describes an inflatable flying wing Unmanned Airborne Vehicle (UAV) that is relatively small, highly portable and extremely stealthy.

BACKGROUND OF THE INVENTION

The military has two obvious uses for a UAV—as a weapons platform and for reconnaissance. The forward observer has always been a problem. If he is close enough to see everything, he is also close enough to be discovered and attacked. As the action heats up the reliability and frequency of his observations go down. The solution to these problems is a UAV carrying a sensor package; a solution that has long been recognized. By putting the pilot/observer at some distance from the target, he can be kept safe. At the same time his observations are essentially from close range and can therefore be very reliable. Because he is not in immediate danger he can remain on station for some time and continue reporting.

The question then is not the value of an UAV, but rather, how to make one small and inexpensive, yet still able to perform useful missions.

Flying wings have obvious advantages and have been an intriguing prospect for many years. Their basic problem is that they are only marginally stable in pitch. (They are also less than terrific in yaw, but this deficiency can be accommodated by increased dihedral.) In the '50s Northrop built several. Their poor stability characteristics made them difficult to fly and they never lived up to promise.

A flying wing needs stability augmentation. But in the early days, stability augmentation technology was immature. With the development of missiles in the '60s and '70s the technology improved dramatically. (Many missiles have neutral or slightly negative stability during some portion of their flight.) Autopilots were developed that utilized rate gyros for feedback in servo controlled systems. The performance of the gyros improved (they became smaller, more accurate and dependable). Electronics evolved from vacuum tubes to solid state technology with dramatic improvements in size, power consumption and reliability. In short, stability augmentation became a mature technology.

But a return to flying wing development didn't happen. Perhaps because its champion, Jack Northrop, died. And perhaps because there is a reluctance to depend on an active device for the aircraft's basic safety if such can be avoided. This is a powerful argument when lives are at stake. It should not, however, be a deterrent for an unmanned aircraft.

The Wrights included wing warping among their control devices. Later, with the introduction of metal wing construction it was abandoned. Conventional metal wings are very stiff in torsion; a property arising from their box beam design and from the high shear stiffness of the metal. Composite structures also have considerable torsional stiffness, depending primarily on the matrix material. Fabrics however have, in themselves, very little shear stiffness. The wing will therefore be very responsive to the controls. That is, there will be a maximum twist per pound of pull on the control cables. Vehicle response (Gs/pound of pull on the control cables) will therefore be high, the control power required low.

SUMMARY OF THE INVENTION

The Duffel Bag Airplane (see FIG. 1) is an inflatable flying wing UAV. The wing, when deflated, will be rolled up into a package about the length of the wing's root chord and only a little larger than the fuselage diameter. The wing can be rolled around the fuselage or it can be rolled separately and stored adjacent the fuselage. The entire vehicle, including the payload will fit in a Duffel Bag. Fabric construction, a small internal combustion engine and wing warping controls combine to make it very inexpensive.

The airplane is extremely stealthy, i.e. hard to detect via visual, radar, thermal or audio detectors. All the usual signatures have been suppressed, which will allow it to make observations from close range. Control, supplemented by stability augmentation, is accomplished by warping the wings. The fuselage is a little longer than the wing's root chord and will house everything but the wings (i.e. sensors, fuel, power plant, radio, power supply, controls and payload).

The absence of a tail allows the fuselage structure to be very lightweight. (The structural loads on the fuselage are very low.) This will allow the use of reinforced plastic as the primary structural material and will have the added advantages of greater stealth and lower cost.

The airplane can be operated by a combination of autonomous and remote control. An on-board autopilot (including an Inertial Measurement Unit—IMU) as are known in the art will provide the necessary stability augmentation.

The Duffel Bag Airplane need not have a landing gear. It may be launched using a small RATO (Rocket Assisted Take Off) bottle and a collapsible ramp.

Several features make a vehicle of this type almost invisible.

1) Radar. The wings are fabric and the fuselage a nonmetallic composite. A radar absorptive material can be added to the composite matrix to further reduce the radar signature. The only metal in the vehicle will be in the power plant, control actuators, sensor and payload.
2) Thermal. The engine exhaust will be cooled to a temperature that the wing material can tolerate by mixing it with inlet air. The cooled, diluted exhaust will be vented through the wing trailing edge thereby diffusing the airplane's thermal signature. In thermal imaging terms, the exhaust from the engine is changed from a bright red spot into a dull, pink blur.

This scheme produces multiple benefits. In addition to the thermal signature being reduced, the engine exhaust pressure will also be reduced thereby making the engine run more efficiently and venting through the trailing edge will create a blown wing effect thereby increasing wing lift.

3) Acoustic. The acoustic signature is due to the engine and propeller. The engine will be muffled and the propeller will have wide chord, low aspect ratio, overlapping blades to minimize its noise.
4) Visual. At 500 to 1,000 feet altitude a small, white or light gray airplane is barely visible (almost impossible even when the observer knows where to look) by the human eye by day or night, even with binoculars.

Figure 1:
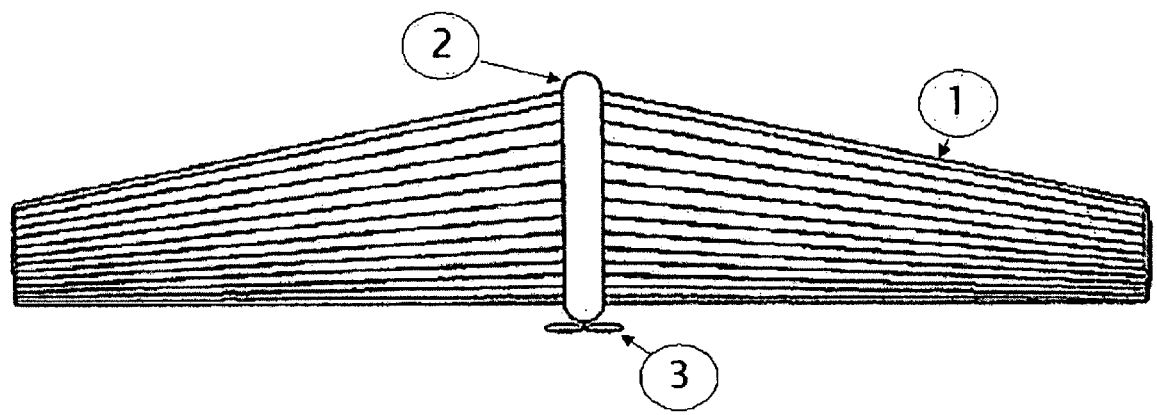
FIG. 1. Plan view of the Duffel Bag Airplane with the wings fully deployed.

DETAILED DESCRIPTION OF THE INVENTION.

The vehicle described herein has, in that regard, several advantages over conventional rigid structure vehicles. They are:

1) Low Cost. Fabric construction, a small internal combustion engine and wing warping controls combine to make the Duffel Bag Airplane very inexpensive. Conventional aircraft are expensive due to the high tooling, fabrication and material costs. Fabric structures, by comparison, utilize construction techniques that do not require expensive molds or finishing processes and whose material costs are relatively low.
2) Small Volume. Past (and current) UAVs, although smaller than full sized aircraft are still large and cumbersome. They need special facilities (e.g. landing gear and runways), if not for takeoff, at least for landing. The design discussed herein has deflatable, detachable wings that can be folded, rolled or stuffed into a small package, which will ease transportability and logistics.
3) Stealth. The wings are made entirely of fabric; the fuselage reinforced plastic, resulting in the airplane having a very small radar signature. The engine exhaust is cooled and blown through the wings thereby diffusing the thermal signature. A special propeller will generate very little noise. And the airplane will be painted white or light gray. With all its signatures so reduced, it will be virtually invisible.
4) Lightweight. The use of high strength/lightweight materials in the design of the inflatable wing offers the potential for significant weight savings over conventional structures. The use of internal pressure to support to the fabric structure eliminates the need for conventional internal support structures, which further reduces aircraft weight.
5) Damage Tolerant. The flexible nature of an inflatable wing makes it tolerant of rough handling. The materials used in the manufacture of inflatable wings can be engineered to provide the skin with excellent cut, puncture and tear resistance.
6) Overload Sensitivity. The wing, because of its flexibility, acts as a buffer for high G loading. Inflatable wings do not have a conventional elastic limit. Severe aerodynamic loads, which might break a rigid structure, produce deformations in a fabric wing from which it recovers when the load is removed.

Relatively little control power is required as a stealthy UAV needn't pull high maneuver Gs. On a typical mission (launch, cruise to station, loiter and return) the only maneuvers required for navigation will be small. Control loads required to maintain aircraft attitude in a gusty environment will probably determine the design control power required.

Recent work at NASA has resulted in the development of a quiet, efficient propeller with very wide chord, low aspect ratio blades (overlapping, much like a marine screw). Such a propeller is envisioned for this airplane.

The communications link serves two purposes. It receives command signals from the remote operator and it transmits observations (sensor signals) back.

In addition to its obvious military value, there are a number of uses for a UAV such as described herein.

1) Surveillance. Ships and aircraft are commonly used to smuggle drugs into our country.
2) Search. In search and rescue missions in the mountains, arctic, ocean, jungle or any terrain difficult to access, these vehicles could operate in the same way as they might for coastal surveillance. That is, one remote operator could control a whole squadron of aircraft thereby allowing a through search in a very short time.
3) Disasters. Forest fires are a danger that demands continuous observation. Other disasters that may be too dangerous to observe by usual means are volcanic eruptions and nuclear accidents.
4) Storm Research. Research and observation of hurricanes and tornadoes will benefit from the availability of an observer in the midst of an environment too severe for conventional aircraft. In this application the inherent flexibility of a fabric structure may allow it to sustain loads that conventional aircraft cannot.

Figure 2:
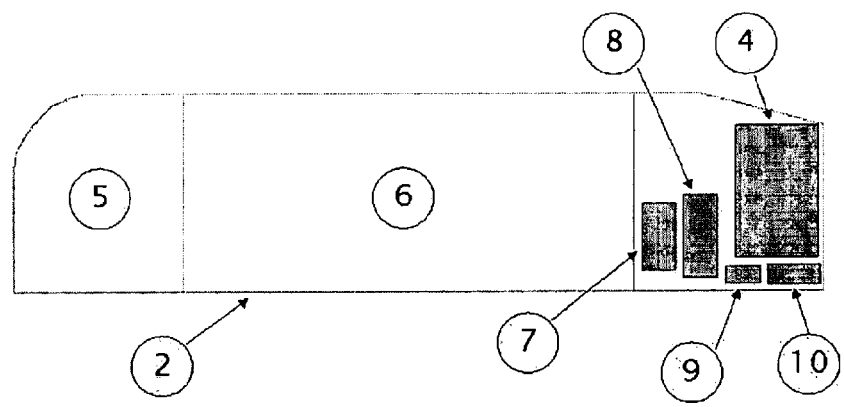
FIG. 2. Inboard Profile
FIG. 3. Cross Section of the wing relative to the fuselage.

All of the equipment is housed in the fuselage 2 (see FIG. 2). It will be understood that the method and apparatus of attaching the various component parts together may take forms as are known in the art. In general, components are said to be attached to the fuselage 2 whether they are connected directly or indirectly through another component.

The sensor package 5 must be able to see forward and down and so must be housed in the nose. The power plant therefore needs be in the rear. With all the machinery in the rear, the airplane's e.g. will be relatively far aft. Balancing the airplane therefore necessitates a swept wing (see FIG. 1) and possibly also moving the wing rearward relative to the fuselage.

The power plant consists of the engine 4 and its controls, fuel management system, compressor 7, blower 8, alternator 10 and propeller 3 (if there is one). Power will be provided by a small internal combustion engine 4. Power is supplied to other components of the airplane from the engine either directly, i.e. a shaft connection, or indirectly, i.e. by electrical current produced by the engine-powered alternator. A compressor 7 will maintain the wing internal pressure and accommodate leakage. It may also power the control actuators 9. A blower 8 will mix inlet air with the engine exhaust and blow it through the wing trailing edge 12. An alternator 10 driven by the engine 4 will supply all on-board electric power. A blower produces a relatively high flow rate at relatively low pressure, whereas a compressor produces a relatively low flow rate at relatively high pressure.

The fuel system will consist of a fuel tank 6, pump and carburetor. The fuel tank will be positioned at the aircraft c.g. to minimize trim perturbations as fuel is spent.

The wing 1 (see FIG. 3) is a complex assembly. Its skins and spars 13 are fabricated of a composite textile. In its stowed configuration, it will be wrapped around the fuselage to obtain a very compact, minimum volume package. When deployed it must have enough lift and strength to support the vehicle at cruising speed and altitude. But an inflatable wing has inherent limitations. It must have a symmetric airfoil; a restriction arising from its need to lie flat (without folds) when deflated. It must be fairly deep for structural reasons. High lift wings generally have a high aspect ratio and this implies high root bending moment and large gust response. The wing, in its deployed configuration must therefore be very strong. A thin wing implies low bending strength and stiffness, which must be compensated for by increased internal pressure. The wing must therefore be as deep as possible consistent with lift and drag limitations. An airfoil such as the NACA 0018 satisfies the requirements.

Figure 3:
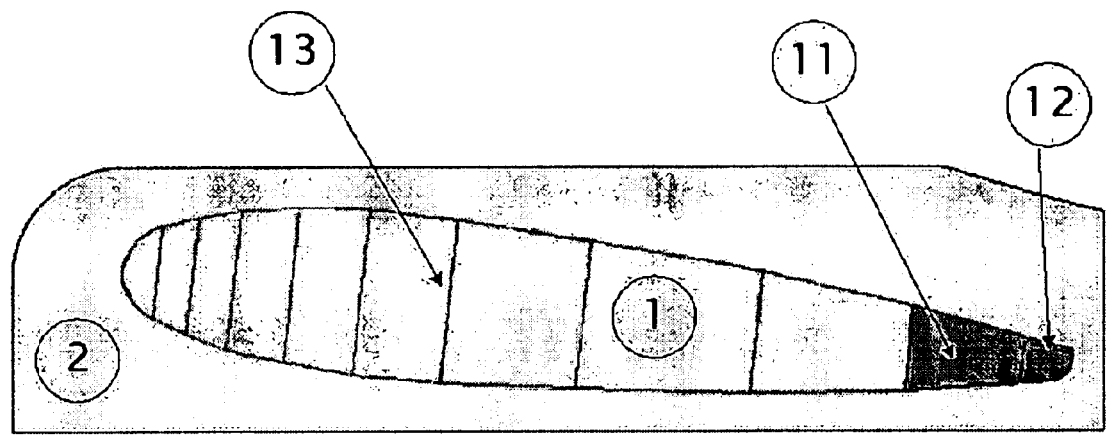

The wing, in addition to its other features is essentially a 'blown wing' (see FIG. 3). The engine will not be exhausted directly to the outside. The exhaust stream will first be cooled by mixing it with fresh inlet air to a temperature consistent with the wing fabric's tolerance. Motive force for mixing the cooling air and the exhaust and for dispersing the cooled exhaust gas from the airplane may be provided by a blower or an air scoop or other such device. If a blower is used, it may be positioned at any point in the flow of the cooling air for moving the cooling air, such as either upstream or downstream of the point where the cooling air and the hot engine exhaust gas are mixed. Depending on the type of engine, the outside air temperature, the engine's operating conditions and the wing materials, the ratio of cooling air to exhaust gas may be in the range from at least 5:1 to as high as 30:1 by mass at a predetermined engine throttle setting (typically full throttle or cruise throttle). In one embodiment, the ratio may be at least 10:1 or between 5:1 and 10:1. The cooled exhaust will be blown through the wing plenum and out the wing trailing edge 12. This will have the effect of increasing the wing lift.

Figure 4:
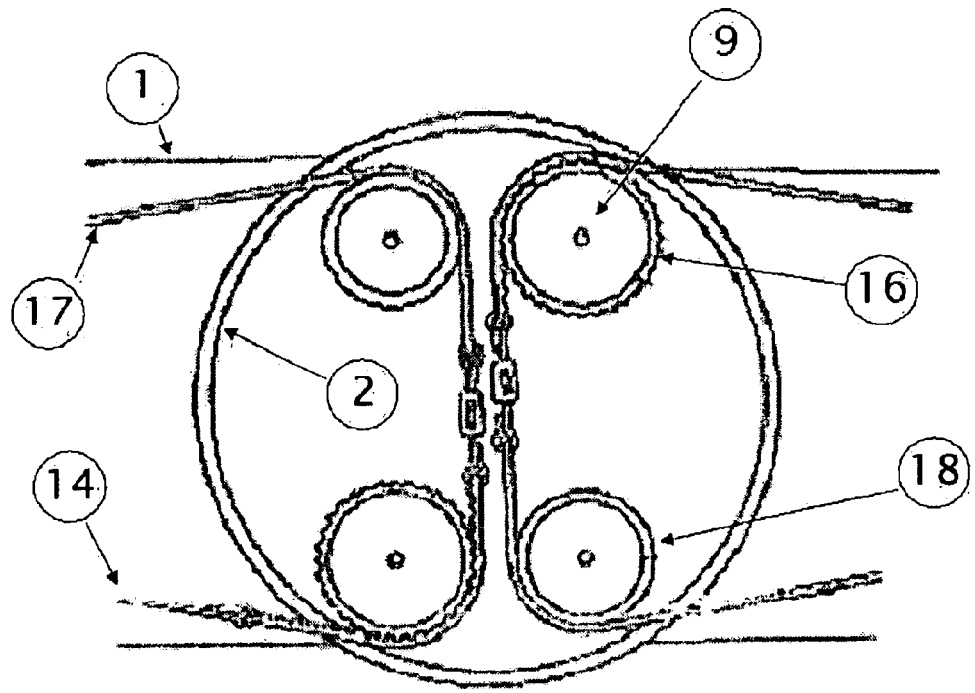
FIG. 4. Wing Control

Inflation can be achieved with onboard equipment (the compressor 7) or by an external source, if that is convenient. Internal pressure is monitored and additional gas supplied to make up for leakage. Aircraft control (see FIG. 4) is accomplished by means of wing warping, using actuators, pulleys and cables.

Control loads will be obtained by warping the wings 1. Actuators 9 housed in the fuselage 2 will generate the control loads. An actuator 9 drives a toothed pulley 16, which in turn drives a section of timing belt 14 (to obtain a positive drive). Cables 17 attached to ends of the timing belt 14 connect to a hard point at the trailing edge of the wing at about one third span. One cable end attaches to the top surface from above and the other to bottom surface from below. The cable, with both ends attached to the wing constitutes a loop. When the drive is powered, one side will be in tension and the other slack. The wing will twist and warp. A spring loaded idler pulley 18 will keep tension in the loop. An identical system controls the other wing. This will work well because the control power needed is small. It has the additional advantages that it consumes little energy, results in less drag than aileron deflections would impose and requires no machinery to be housed in the wing.

Although the basic concept relies primarily on wing twist that is not the only effect of the control loads. They will also produce chordwise bending and give the airfoil a measure of camber. The amount of camber produced depends on the aspect ratio of the wing, its internal construction and the spanwise location of the control cable attachment point. Cambered airfoils, in general, produce more lift and higher L/D than do symmetric airfoils.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

I claim as my invention:

1. A portable, stealthy airplane comprising:
   an inflatable wing deployable in a deflated condition for storage and in an inflated condition for use;
   an engine for propelling the airplane; and
   a blower powered by the engine for moving a flow of air for cooling an exhaust stream produced by the engine prior to the exhaust stream being released from the airplane.

2. The airplane of claim 1, further comprising an exhaust passage formed in the wing for transporting the cooled exhaust stream to an outlet disposed proximate a trailing edge of the wing.

3. The airplane of claim 1, wherein the blower is selected to provide a ratio of cooling air mass to exhaust stream mass to be at least 5:1 at a predetermined engine throttle setting.

4. The airplane of claim 1, further comprising a compressor powered by the engine for providing compressed air to inflate the wing.

5. The airplane of claim 1, further comprising:
   an actuator; and
   a link connecting the actuator and the inflatable wing for selective warping of the wing to effect control of the airplane.

6. The airplane of claim 5, further comprising a stability augmentation system comprising an autopilot and an inertial measurement unit, the actuator being responsive to the stability augmentation system.

7. An airplane comprising:
   an internal combustion engine producing a hot exhaust stream;
   a means for cooling the hot exhaust stream prior to its release from the airplane;
   a wing;
   a first chamber formed in the wing for retaining a compressed gas for providing a desired degree of structural rigidity to the wing; and
   a second chamber formed in the wing for receiving the cooled exhaust stream and for directing the cooled exhaust stream to an outlet disposed proximate a trailing edge of the wing.

8. The airplane of claim 7, wherein the wing comprises a fabric skin, and further comprising a means for selective warping of the wing for directional control of the airplane.

9. The airplane of claim 7, further comprising a compressor powered by the engine for providing compressed air to the first chamber.

10. The airplane of claim 7, further comprising a means for providing a mass flow of cooling air of at least five times a mass flow of a hot exhaust stream produced by the engine.

11. An airplane comprising:
    an inflatable wing deployable in a deflated condition for storage and in an inflated condition for use;
    an engine for propelling the airplane;
    an on-board compressor powered by the engine for inflating the wing for use; and
    an on-board blower for dispersing a flow of cooled engine exhaust prior to the discharge of the exhaust from the airplane.

12. The airplane of claim 11, further comprising an exhaust passage formed through the wing for directing the cooled exhaust to an outlet proximate a trailing edge of the wing.

13. The airplane of claim 12, further comprising a means for selective warping of the wing for directional control of the airplane.

14. The airplane of claim 13, wherein the means for selective warping comprises:
    an actuator; and
    a cable connecting the actuator and the wing for selective warping of the wing in response to movement of the actuator.

15. The airplane of claim 14, further comprising a stability augmentation system comprising an autopilot and an inertial measurement unit, the actuator being responsive to the stability augmentation system.

16. The airplane of claim 15, further comprising an on-board reconnaissance sensor.

17. The airplane of claim 16, further comprising a radar-absorbing material disposed on a surface of the airplane.

18. The airplane of claim 11, further comprising the blower providing a mass flow of cooling air of at least five times a mass flow of hot exhaust produced by the engine.

19. The airplane of claim 11, further comprising the blower providing a mass flow of cooling air of at least ten times a mass flow of hot exhaust produced by the engine.

20. A stealthy airplane comprising:

an airfoil for providing lift;

an engine for providing motive force and producing hot exhaust; and a blower for producing a flow of cooling air for mixing with the hot exhaust to produce cooled exhaust for exiting the airplane further comprising a plenum formed in the airfoil for directing the cooled exhaust to an outlet disposed proximate a trailing edge of the airfoil.

21. The stealthy airplane of claim 20, wherein the airfoil comprises an inflatable structure, and further comprising a compressor powered by the engine for inflating the inflatable structure.

* * * * *